US012027357B2

(12) United States Patent
Collings et al.

(10) Patent No.: US 12,027,357 B2
(45) Date of Patent: Jul. 2, 2024

(54) INCREASED DYNAMIC RANGE FOR THE ATTENUATION OF AN ION BEAM

(71) Applicant: DH Technologies Development PTE. LTD., Singapore (SG)

(72) Inventors: Bruce Collings, Bradford (CA); Pascal Martin, Woodbridge (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 372 days.

(21) Appl. No.: 17/622,568

(22) PCT Filed: Jul. 22, 2020

(86) PCT No.: PCT/IB2020/056924
§ 371 (c)(1),
(2) Date: Dec. 23, 2021

(87) PCT Pub. No.: WO2021/014390
PCT Pub. Date: Jan. 28, 2021

(65) Prior Publication Data
US 2022/0254619 A1 Aug. 11, 2022

Related U.S. Application Data

(60) Provisional application No. 62/877,542, filed on Jul. 23, 2019.

(51) Int. Cl.
*H01J 49/00* (2006.01)
*H01J 49/02* (2006.01)
*H01J 49/06* (2006.01)

(52) U.S. Cl.
CPC ...... *H01J 49/0031* (2013.01); *H01J 49/0036* (2013.01); *H01J 49/022* (2013.01); *H01J 49/067* (2013.01)

(58) Field of Classification Search
CPC .. H01J 49/0031; H01J 49/0036; H01J 49/022; H01J 49/067; H01J 49/4265;
(Continued)

(56) References Cited

U.S. PATENT DOCUMENTS 5,087,815 A * 2/1992 Schultz .................. H01J 49/40
250/307
2009/0159791 A1 * 6/2009 Wells .................. H01J 49/4265
250/282

(Continued)

FOREIGN PATENT DOCUMENTS

GB 2428876 A 2/2007

OTHER PUBLICATIONS

International Search Report dated Oct. 2, 2020 in corresponding PCT App. No. PCT/IB2020/056924 (4 pages).

(Continued)

*Primary Examiner* — Kiet T Nguyen
(74) *Attorney, Agent, or Firm* — Reza Mollaaghababa; Brian Hairston; Potomac Law Group, PLLC

(57) ABSTRACT

In one aspect, a method of modulating transmission of ions in a mass spectrometer is disclosed, which comprises generating an ion beam comprising a plurality of ions, directing the ion beam to an ion optic positioned in the path of the ion beam, wherein the ion optic includes at least one opening through which the ions can pass, and applying one or more voltage pulses at a selected duty cycle to said ion optic so as to obtain a desired attenuation of brightness of the ion beam passing through the ion optic, where a pulse width of said voltage pulses at said selected duty cycle is determined by identifying a pulse width on a calibration normalized ion intensity versus pulse width relation for said ions that corresponds to said desired attenuation on an ideal normalized ion intensity versus pulse width relation for said ions.

22 Claims, 43 Drawing Sheets

(58) Field of Classification Search
CPC ........ H01J 49/025; H01J 49/063; H01J 49/10; H01J 49/4215
USPC .......................................................... 250/287
See application file for complete search history.

(56) References Cited

U.S. PATENT DOCUMENTS

| | | | |
|---|---|---|---|
| 2010/0019144 | A1 | 1/2010 | Schwartz et al. |
| 2013/0181125 | A1 | 7/2013 | Guna et al. |

OTHER PUBLICATIONS

Written Opinion of the International Searching Authority dated Oct. 2, 2020 in corresponding PCT App. No. PCT/IB2020/056924 (9 pages).
Hager, J., "A new linear ion trap mass spectrometer," Rapid Communications in Mass Spectrometry, 16(6): 512-526 (2002).

* cited by examiner

Signal as a function of the potential applied
To the downstream lens of the double IQ0 lens,
m/z 616 PPG v.s. m/z 622 Agilent Signal as a function of the potential applied to the downstream Lens of the doube IQ0 lens, m/z 1545 PPG v.s. m/z 1522 Agilent Signal as a function of the potential applied to the downstream lens of the double IQ0 lens, m/z 2010 PPG v.s. m/z 2122 Agilent Signal as a function of the potential applied to a Single IQ0 lens and pressure in the Qjet/Q0 regions Signal as a function of the potential applied to a single IQ0 lens and pressure in the Qjet/Q0 regions Signal as a function of the potential applied to a single IQ0 lens and pressure in the Qjet/Q0 regions Signal as a function of the potential applied to the downstream lens of the double IQ0 lens or to the single IQ0 lens Signal as a function of the potential applied to the downstream lens of the double IQ0 lens or to the single IQ0 lens Signal as a function of the potential applied to the downstream lens of the double IQ0 lens or to the single IQ0 lens Signal as a function of the potential applied to the downstream lens of the double IQ0 lens or to the single IQ0 lens Signal as a function of the potential applied to the downstream lens of the double IQ0 lens, fragment ion versus non-fragment ion Signal intensity versus pulse width applied to the lens,
40V pulse amplitude Signal intensity versus pulse width applied to the lens, 40 V pulse amplitude Signal intensity versus pulse width applied to the lens, 40 V pulse amplitude Signal intensity versus pulse width applied to the lens, 40 V pulse amplitude Signal intensity versus pulse width applied to the lens, 40 V pulse amplitude IQ0 duty cycle linearity using faster pulse,
50 V pulse amplitude, correction ON
Negative ion mode IQ0 duty cycle linearity using faster pulse, 50 V pulse amplitude, correction ON EPI mode IQ0 duty cycle linearity using faster pulse, 50 V duty cycle IQ0 duty cycle linearity using faster pulse, 50 V pulse amplitude, correction ON
Single lens v.s. dual lens IQ0 duty cycle linearity using faster pulse
50 V pulse amplitude, correction ON
Single lens v.s. dual lens

INCREASED DYNAMIC RANGE FOR THE ATTENUATION OF AN ION BEAM

RELATED APPLICATIONS

The present application is the national stage of International Application No. PCT/IB2020/056924 filed on Jul. 22, 2020 titled "Increased Dynamic Range for the Attenuation of an Ion Beam," which claims priority to a U.S. provisional patent application filed on Jul. 23, 2019 titled "Increased Dynamic Range for the Attenuation of an Ion Beam," and having an Application No. 62/877,542, each of which is herein incorporated by reference in its entirety.

INTRODUCTION

The present teachings are generally related to methods and systems for modulating the transmission of ions into a component of a mass spectrometer, and more particularly to such methods and systems that can be employed to increase the dynamic range for the attenuation of an ion beam in a mass spectrometer.

Mass spectrometry (MS) is an analytical technique for measuring mass-to-charge ratios of molecules, with both qualitative and quantitative applications. MS can be useful for identifying unknown compounds, determining the structure of a particular compound by observing its fragmentation, and quantifying the amount of a particular compound in a sample. Mass spectrometers detect chemical entities as ions such that a conversion of the analytes to charged ions must occur during sample processing.

It is often necessary to attenuate the intensity of an ion beam in a mass spectrometer, for example, to avoid detector saturation, reduce space charge which can have an adverse effect on the performance of quadrupole mass filters, or prevent over-filling of an ion trap, among others. The ability to reduce the intensity of an ion beam in a predictable fashion can also reduce the number of dilutions required for analysis of a sample in a mass spectrometer.

A conventional technique for reducing the intensity of ion beam is to vary the electric potential applied to a lens positioned in proximity of an inlet port of a mass spectrometer component from transmitting to non-transmitting mode. The reduction in the beam intensity can be proportional to the duty cycle of the electric potential applied to the lens. For example, such a technique has been used to attenuate an ion beam by pulsing the electric potential applied to a skimmer of a mass spectrometer.

Such a technique, however, suffers from non-linearity at low duty cycles.

Accordingly, there is a need for enhanced methods and systems for attenuating intensity of an ion beam in a mass spectrometer, and particularly a need for such methods and systems that allow linear attenuation of the intensity of an ion beam over a large range of intensities.

SUMMARY

In one aspect, a method of modulating transmission of ions in a mass spectrometer is disclosed, which comprises generating an ion beam comprising a plurality of ions, directing the ion beam to an ion optic positioned in the path of the ion beam, wherein the ion optic includes at least one opening through which the ions can pass, and applying one or more voltage pulses at a selected duty cycle to said ion optic so as to obtain a desired attenuation of brightness of the ion beam passing through the ion optic, where a pulse width of said voltage pulses at said selected duty cycle is determined by identifying a pulse width on a calibration normalized ion intensity versus pulse width relation for said ions that corresponds to said desired attenuation on an ideal normalized ion intensity versus pulse width relation for said ions.

In some embodiments, the calibration normalized ion intensity versus pulse width relation is obtained via a linear fit to data corresponding to normalized intensity of said ions transmitted through said ion optic as a function of pulse widths of a plurality of voltages applied to said ion optic at said selected duty cycle.

By way of example, the ideal normalized ion intensity versus pulse width relation can be defined by the following linear relation:

$$y = m_1 x_1, \qquad \text{Eq. (1)}$$

where, y represents normalized ion intensity, $x_1$ represents ideal pulse width, and $m_1$ represents a slope of the linear relation The calibration normalized ion intensity versus pulse width relation can be defined by the following linear relation:

$$y = m_2 x_2 + b, \qquad \text{Eq. (2)}$$

where, y represents normalized ion intensity, $x_2$ represents pulse width of the voltage pulses applied to said ion optic, $m_2$ represents slope of the linear relation, and b represents intercept of the linear relation.

The above Equations (1) and (2) can be employed to determine a pulse width $x_2$ for application to the ion optic according to the following relation:

$$x_2 = \frac{(m_1 x_1 - b)}{m_2} \qquad \text{Eq. (3)}$$

In some embodiments, the calibration normalized ion intensity for a voltage pulse width associated with a plurality of voltage pulses applied to said ion optic at said duty cycle is obtained as a ratio of measured intensity of ions passing through said ion optic at that voltage pulse width relative to measured intensity of ions passing through said ion optic at a calibration voltage pulse width associated with a plurality of calibration voltage pulses applied to said ion optic at said duty cycle. By way of example, the calibration voltage pulses can have a pulse width of about 200 microseconds and can be applied to the ion optic at a duty cycle of about 5%.

In some embodiments, the above slope ($m_2$) and intercept (b) can be obtained via a polynomial fit to measured normalized ion intensity for ions having a plurality of different m/z ratios. Such a polynomial fit can be used to obtain values of $m_2$ and b for use in the above Eq. (3) when calculating a pulse width for voltage pulses to be applied to the ion optic.

In some embodiments, an ion beam can include ions having a plurality of different m/z ratios. In some such embodiments, the above Eq. (3) can be employed to determine the pulse width for one of the m/z ratios. The determined pulse width can then be applied to the ion optic. Although the determined pulse width may differ from an optimal pulse width for m/z ratios other than the one used to determine the pulse width, nonetheless the use of the determined pulse width can enhance linearity of ion transmission, especially when the m/z ratios span a range of values equal or less than about 200 Da for low (e.g., 50 to 250 Da) and middle (e.g., 600 to 800 Da) mass ranges and even wider range (e.g., 300 Da) for a higher mass range mass range.

In some embodiments, the pulse width of the voltage pulses applied to the ion optic can be equal to or less than about 2000 microseconds, e.g., in a range of about 4 microseconds to about 2000 microseconds. Further, in some embodiments, the rise time of the voltage pulses applied to the ion optic can be equal to or less than about 20 microseconds. In some embodiments, the voltage pulses have an amplitude that is selected to inhibit transmission of ions, preferably all ions, to components disposed downstream of the ion optic during an inhibitory phase of the voltage pulses.

The voltage pulses can be applied to the ion optic at a variety of different duty cycles. For example, the duty cycle can be in a range of about 0.1% to about 5%, e.g., 1%, 2%, 3%, 4% or any other value in this range.

In some embodiments, the present teachings can be employed to attenuate the brightness of an ion beam in a mass spectrometer by a factor in a range of about 0.1% to about 5%.

In some embodiments, the method further comprises positioning any of a mass filter and an ion trap downstream of the ion optic such that the ion optic is disposed in proximity of an inlet of the mass filter or the ion trap for modulating transmission of ions thereto. As discussed in more detail below, the ion optic can be positioned in a region in which a background gas provides a sufficient pressure so as to cause the ions to lose some of their axial kinetic energy as a result of collisions with the background gas, thus allowing the ions to be trapped by the ion optic when the voltage applied to the ion optic is intended to inhibit transmission of the ions to a downstream component of the spectrometer. By way of example, the background pressure of the region in which the ion optic is disposed can be in a range of about a few millitorrs (e.g., 1 mTorr, to about 10 mTorr).

In a related aspect, a method of modulating transmission of ions in a mass spectrometer is disclosed, which comprises generating an ion beam comprising a plurality of ions, directing the ion beam to an ion optic positioned in the path of the ion beam, wherein the ion optic includes at least one opening through which the ions can pass, and applying one or more voltage pulses to said ion optic at a selected duty cycle so as to modulate passage of the ions through the ion optic, where a pulse width of said voltage pulses is determined by calculating an adjustment to a pulse width of an ideal pulse that would result in a desired normalized intensity for ions passing through said ion optic. The step of calculating the adjustment can include utilizing an ideal normalized ion intensity versus pulse width relation and a calibration normalized ion intensity versus pulse width relation for said ions.

In a related aspect, a mass spectrometer is disclosed, which comprises an ion source for generating an ion beam comprising a plurality of ions, an ion optic positioned in a path of said ion beam, said ion optic comprising at least one opening through which ions can pass, and a voltage source configured for applying one or more voltage pulses to said ion optic at a selected duty cycle so as to obtain a desired attenuation of brightness of the ion beam, where the voltage pulses have a pulse width corresponding to a pulse width on a calibration normalized ion intensity versus pulse width relation for said ions that corresponds to said desired attenuation on an ideal normalized ion intensity versus pulse width relation for said ions.

The mass spectrometer can further include a controller for determining said pulse width of the voltage pulses by identifying said pulse width on said calibration normalized ion intensity versus pulse width relation. The controller can be in communication with the voltage source to communicate said determined pulse width to the voltage source.

In some embodiments, the voltage pulses have a rise time less than about 20 microseconds. Further, in some embodiments, the voltage pulses have a pulse width in a range of about 4 microseconds to about 200 microseconds. Further, the voltage pulses can have an amplitude selected to inhibit transmission of ions, and preferably all ions, through the ion optic to which the voltage pulses are applied during the inhibitory phases of the voltage pulses. By way of example, the voltage pulses can have an amplitude of at least about 50 volts.

In some embodiments, the controller controls the voltage source so as to apply said voltage pulses to said ion optic at a duty cycle less than about 5%, e.g., at a duty cycle in a range of about 0.1% to about 5%.

In some embodiments, the mass spectrometer can further include a mass filter, e.g., a quadrupole mass filter, that is disposed downstream of the ion optic such that the ion optic is positioned in proximity of an inlet port of the mass filter for modulating the transmission of ions into the mass filter. In some embodiments, an ion trap, e.g., a linear ion trap (e.g., a quadrupole linear ion trap), is disposed downstream of the ion optic such that the ion optic is positioned in proximity of an inlet port of the ion trap for modulating the transmission of ions into the ion trap.

DETAILED DESCRIPTION

The present teachings relate generally to methods and systems for modulating transmission of ions into a component of a mass spectrometer, such as a mass filter or an ion trap, such as a linear ion trap. In some embodiments, one or more voltage pulses are applied to an ion optic, such as an ion lens, that is positioned in the path of an ion beam of the mass spectrometer to modulate the transmission of the ions through the ion optic. The pulse width of the voltage pulses can be determined by using a calibration ion intensity versus pulse width relation and an ideal ion intensity versus pulse width relation in a manner discussed in more detail below.

Various terms are used herein in accordance with their ordinary meanings in the art. The following terms are defined to provide further clarification:

The term "brightness of an ion beam," as used herein, is a measure of the number of ions that pass through a specified area per unit time.

The term "rise time of a pulse," as used herein, refers to the time required for a pulse to increase from zero to 90% of its amplitude.

The term "duty cycle" as used herein refers to the percentage of time that ions are transmitted through an ion optic to which voltage pulses according to the present teachings are applied over a cycle time, where a cycle time refers to the time interval between consecutive voltage pulses.

The term "calibration normalized ion intensity versus pulse width" as used herein refers to the ratio of measured ion intensity relative to a reference ion intensity as a function of a plurality of pulse widths applied to an ion optic through which the ions pass, The term "ideal normalized ion intensity versus pulse width" as used herein refers to calculated ratio of ion intensity relative to a calculated reference ion intensity as a function of a plurality of voltage pulses having an ideal pulse width characterized by a vanishing rise time and a sufficiently high amplitude to prevent 100% transmission of ions during their non-transmission phase, The term "about" as used herein refers to variation of a numerical value of at most +/−10 percent.

The term "substantially" as used herein refers to a deviation from a complete state or condition of at most about +/−10 percent.

Figure 1:
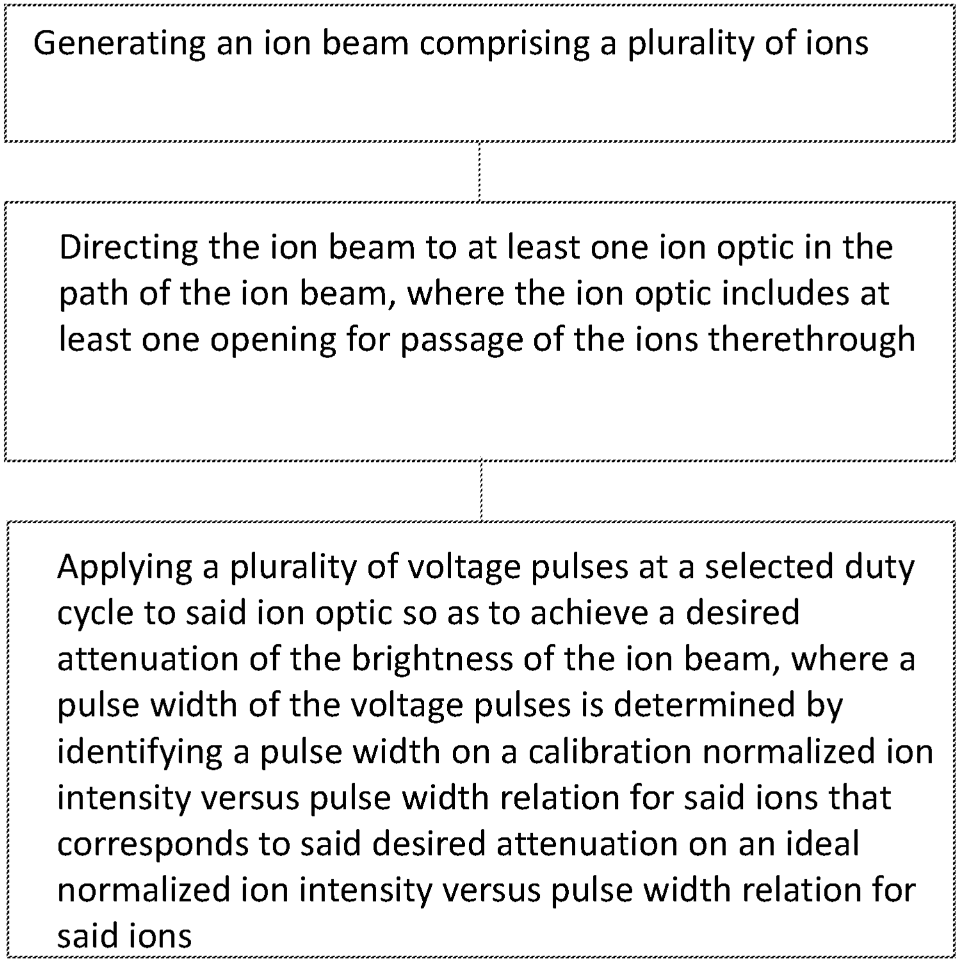
FIG. 1 is a flow chart depicting various steps in an embodiment of the present teachings for attenuating an ion beam in a mass spectrometer, FIG. 2 schematically depicts a mass spectrometer according to an embodiment of the present teachings.

FIG. 1 is a flow chart depicting various steps in an embodiment of a method according to the present teachings for modulating transmission of an ion beam in a mass spectrometer. The method includes generating an ion beam comprising a plurality of ions (step 1) and directing the ion beam to at least one ion optic positioned in the path of the ion beam, where the ion optic includes at least one opening through which the ion bean can pass (step 2). One or more voltages can be applied at a selected duty cycle to the ion optic so as to obtain a desired attenuation of brightness of the ion beam (step 3). The pulse width of the voltage pulses can be determined by employing an ideal normalized ion intensity versus pulse width relation and a calibration normalized ion intensity versus pulse width relation for the ions. More particularly, the pulse width of the voltage pulses can be determined by identifying a pulse width on the calibration normalized ion intensity versus pulse width relation that corresponds to the desired attenuation on the ideal normalized ion intensity versus pulse width relation for said ions.

Figure 20:
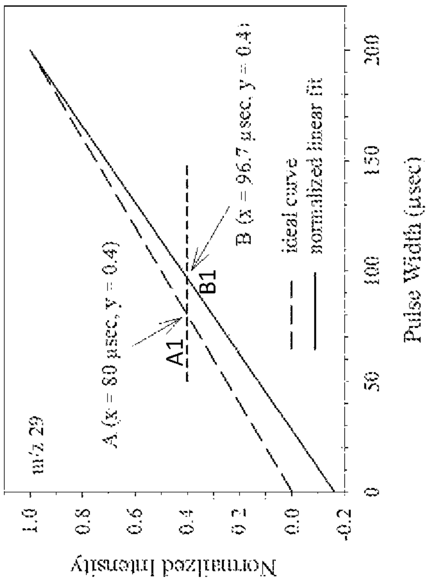
FIG. 20 shows the use of plots presented in FIG. 19 to identify a pulse width for the voltage pulses that would result in a desired normalized ion intensity.

By way of example, FIG. 20 schematically depicts an ideal normalized ion intensity versus pulse width relation (A) and a calibration normalized ion intensity versus pulse width relation (B) for an ion having m/z 29. The ideal ion intensity versus pulse width relation can be theoretically obtained by assuming that the voltage pulses applied to the ion optic have a vanishing rise time and a sufficiently high amplitude that can inhibit transmission of all ions during their inhibitory phase.

The calibration relation can be obtained by measuring the intensity of ions that pass through the ion optic at the selected duty cycle as a function of the pulse width for a plurality of voltage pulses applied to the ion optic and normalizing the measured ion intensity relative to a reference ion intensity. For example, the calibration normalized ion intensity versus pulse width data depicted in FIG. 18 was normalized relative to ion intensity data obtained via application of 200-μsec voltage pulses to the ion optic at a duty cycle of 5%, as discussed in more detail below.

In some embodiments, both the ideal normalized ion intensity versus pulse width and the calibration normalized ion intensity versus pulse width can be in the form of linear relations. By way of example, in some embodiments, the ideal ion intensity versus pulse width can be defined by the above relation (1) and the calibration ion intensity versus pulse width can be in turn defined by the above relation (2). As discussed above, the two relations can be used to provide above relation (3), which defines the pulse width of the actual voltage pulses as a function of pulse width of the ideal voltage pulses.

While the coefficient $m_1$ is mass independent due to the assumed vanishing rise time of the ideal voltage pulses, the coefficients $m_2$ and b are mass dependent due to finite rise time of the actual voltage pulses. In addition, as noted above, the kinetic energy of the ions can be influenced by the number of collisions with the background gas they suffer near the ion optic, which can cause kinetic energy loss. This can in turn result in ions having different axial kinetic energies, which also contributes to the mass dependence of $m_2$ and b. In some embodiments, the above slope ($m_2$) and intercept (b) can be obtained via a polynomial fit to measured normalized ion intensity for ions having a plurality of different m/z ratios. Such a polynomial fit can be used to obtain values of $m_2$ and b for use in the above Eq. (3) when calculating a pulse width for voltage pulses to be applied to the ion optic. In various aspects, other suitable forms of fits to the data can be used.

Figure 21A:
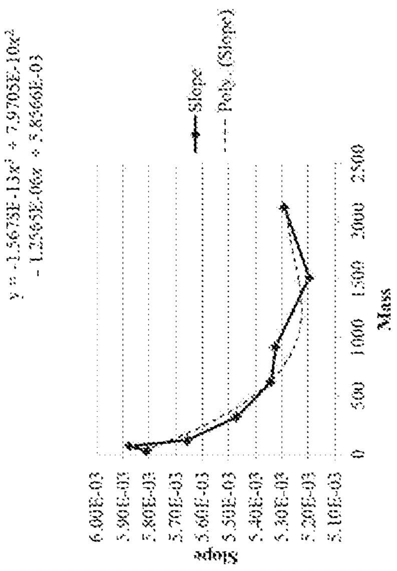
FIG. 21A shows mass-dependent slope of a linear relation for identifying a pulse width of voltage pulses in accordance with an embodiment of the present teachings as a function of ion mass.
Figure 21B:
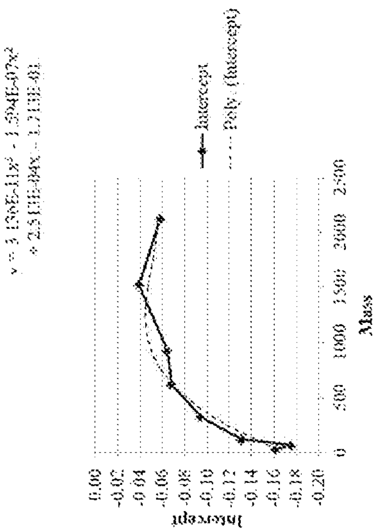
FIG. 21B shows mass-dependent intercept of a linear relation for identifying a pulse width of voltage pulses in accordance with an embodiment of the present teachings as a function of ion mass.

By way of example, FIG. 21A and FIG. 21B show an example of measured mass dependence of the coefficients $m_2$ and b. In this example, a fit to the measured data can result in the following relation for $m_2$ and b as a function of ion mass (x):

$$m_2 = -1.5678\times10^{-13}x^3 + 7.9705\times10^{-13}x^2 - 1.2565\times10^{-6}x + 5.8566\times10^{-3}, \quad \text{Eq. (4)}$$

$$b = 3.136\times10^{-11}x^3 - 1.594\times10^{-7}x^2 + 2.513\times10^{-4}x - 1.713\times10^{-1} \quad \text{Eq. (5)}$$

It should be understood that the linear fits in the above Equations (4) and (5) are for a specific example, and they can vary for other examples of ions, e.g., because of variations in pulse rise time, pressure, and spacing of the between the IQ0 lens and the Q0 ion optic.

Figure 18A:
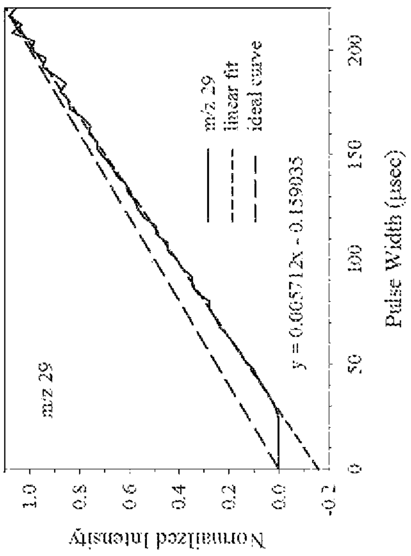
FIG. 18A shows plots of ideal and calibration normalized ion intensity versus pulse width for voltage pulses having a rise time of 14 microseconds and an amplitude of 40 V for an ion having m/z 29.
Figure 18B:
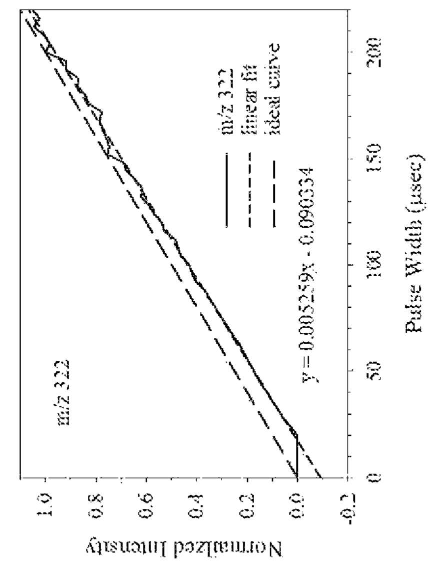
FIG. 18B shows plots of ideal and calibration normalized ion intensity versus pulse width for voltage pulses having a rise time of 14 microseconds and an amplitude of 40 V for an ion having m/z 322.
Figure 18C:
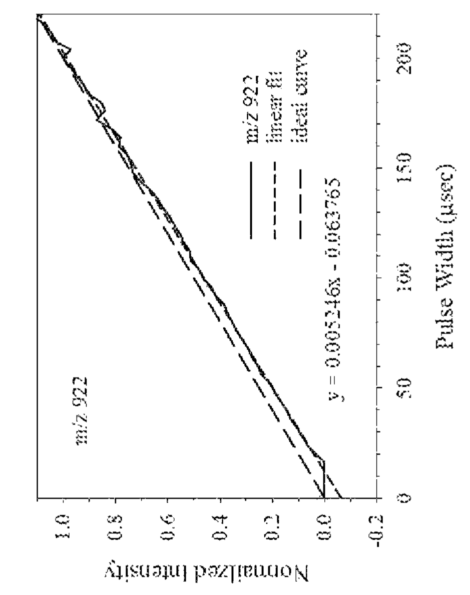
FIG. 18C shows plots of ideal and calibration normalized ion intensity versus pulse width for voltage pulses having a rise time of 14 microseconds and an amplitude of 40 V for an ion having m/z 29.
Figure 18D:
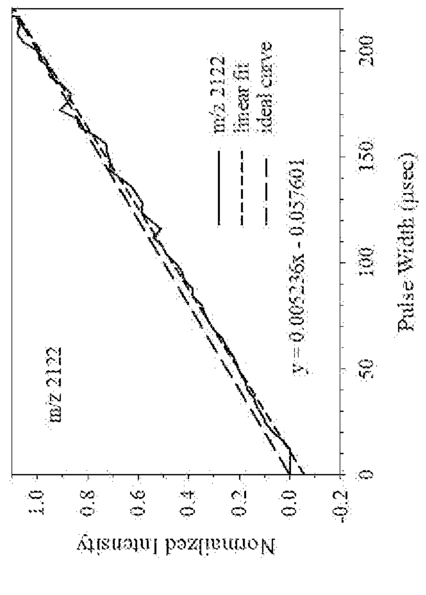
FIG. 18D shows plots of ideal and calibration normalized ion intensity versus pulse width for voltage pulses having a rise time of 14 microseconds and an amplitude of 40 V for an ion having m/z 2122.

With continued reference to FIG. 18A, in this example, the ideal normalized ion intensity versus pulse width is in the form of relation (1) and the calibration normalized ion intensity versus pulse width relation is obtained by fitting the measured normalized ion intensities to the relation (2).

With reference to FIG. 20, by way of example, if a normalized ion intensity of 0.4 is desired, then one can draw a line parallel to the pulse width axis that intersects the ideal relation at point A1 and the calibration relation at point B1, thereby indicating that a normalized ion intensity of 0.4 can be achieved with an actual pulse width of about 96.7 microseconds whereas for ideal voltage pulses a pulse width of about 80 microseconds would be sufficient. In other words, the ideal normalized ion intensity versus pulse width and the calibration normalized ion intensity versus pulse width can be used to identify an adjustment of 16.7 microseconds to the ideal pulse width so as to obtain an actual pulse width that would achieve the desired normalized ion intensity of 0.4 for ions passing through the ion optic.

In some embodiments, the ion optic can be in the form of a lens positioned in proximity of an inlet port of a component of the mass spectrometer. For example, the ion optic can be in the form of a lens positioned in proximity of an inlet port of a mass filter or an ion trap, e.g., a linear ion trap, so as to modulate the transmission of ions into the mass filter or the ion trap. In some embodiments, the ion optic can be composed of two or more lenses that are positioned in tandem for modulating the intensity of an ion beam passing therethrough.

In some embodiments, the duty cycle of the voltage pulses applied to the ion optic can be, for example, in a range of about 0.1% to about 5%. In some embodiments, the present teachings advantageously allow an enhanced linearity of ion intensity modulation at duty cycles of even as low as about 0.1%.

As noted above, the coefficients $m_2$ and b in the above relation 3 are mass dependent. Thus, the relation 3 defines the requisite pulse width for a particular ion mass. In some embodiments, an ion beam can include a plurality of ion types having different m/z ratios. In some such embodiments, the pulse width of the voltage pulses for application to the ion optic can be determined for an m/z ratio within the range of m/z ratios exhibited by the ions within the ion beam. Although such a pulse width is determined only for one of the m/z ratios, if the spread of m/z ratios exhibited by the ions is not too broad the advantages associated with the present teachings can still be achieved. For example, in some embodiments in which the spread of the m/z ratios of ions within an ion beam is less than about 200 Da, this approach can result in a much enhanced linear attenuation of the ion beam, particularly at low duty cycles of the voltage pulses.

Figure 2:
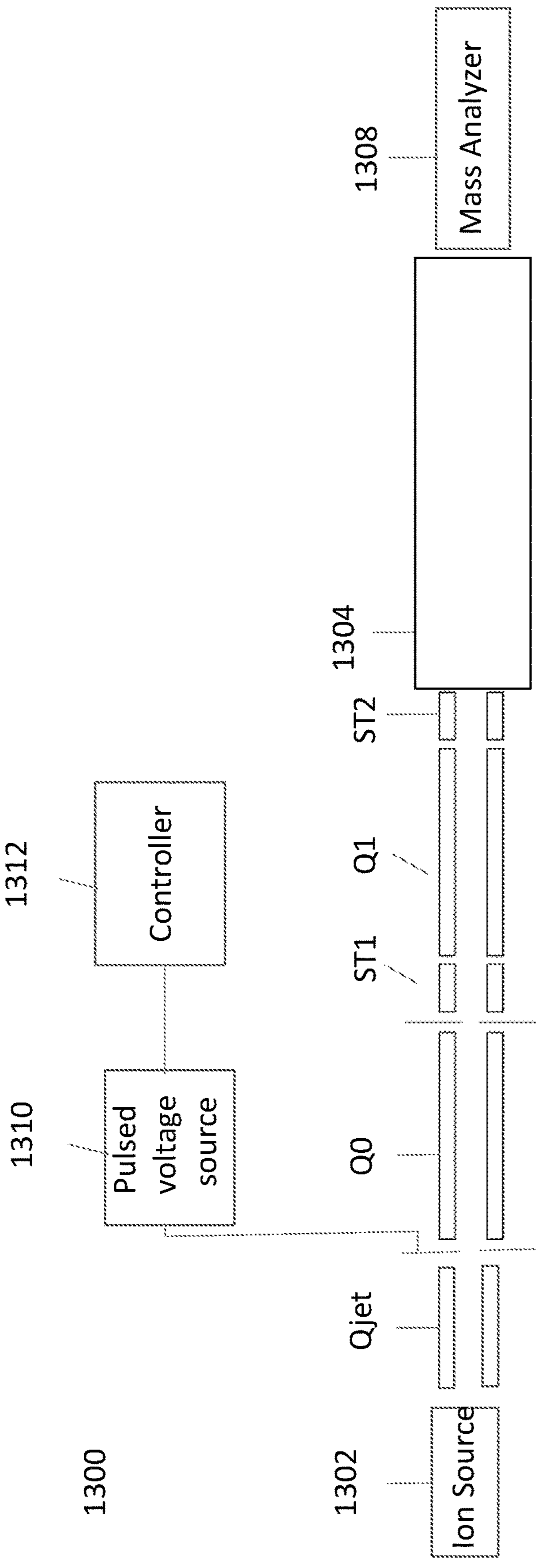

The present teachings can be implemented in a variety of different mass spectrometers. By way of example, FIG. 2 schematically depicts a mass spectrometer 1300 that includes an ion source 1302 for generating an ion beam comprising a plurality of ions. The ion source can be separated from the downstream section of the spectrometer by a curtain chamber (not shown) in which an orifice plate (not shown) is disposed, which provides an orifice through which the ions generated by the ion source can enter the downstream section. In this embodiment, an RF ion guide (QJet) can be used to capture and focus the ions using a combination of gas dynamics and radio frequency fields. In this embodiment, the ions traverse a QJet quadrupole that utilizes a combination of gas dynamics and radio frequency fields to provide improved capture rate and the efficient transport of ions to downstream elements despite the gas load associated with the larger sampling orifice. A lens IQ0 is disposed between the QJet and a downstream Q0 ion guide.

The ion guide Q0 delivers the ions via a lens IQ1 and stubby ST1 to a downstream quadrupole mass analyzer Q1, which can be situated in a vacuum chamber that can be evacuated to a pressure that can be maintained lower than that of the chamber in which RF ion guide Q0 is disposed. By way of non-limiting example, the vacuum chamber containing Q1 can be maintained at a pressure less than about $1\times10^{-4}$ Torr (e.g., about $5\times10^{-5}$ Torr), though other pressures can be used for this or for other purposes.

As discussed in more detail below, a plurality of voltage pulses according to the present teachings can be applied to the lens IQ0 at a selected duty cycle so as to provide a desired attenuation of the ion beam.

As will be appreciated by a person of skill in the art, the quadrupole rod set Q1 can be operated as a conventional transmission RF/DC quadrupole mass filter that can be operated to select an ion of interest and/or a range of ions of interest. By way of example, the quadrupole rod set Q1 can be provided with RF/DC voltages suitable for operation in a mass-resolving mode. As should be appreciated, taking the physical and electrical properties of Q1 into account, parameters for an applied RF and DC voltage can be selected so that Q1 establishes a transmission window of chosen m/z ratios, such that these ions can traverse Q1 largely unperturbed. Ions having m/z ratios falling outside the window, however, do not attain stable trajectories within the quadrupole and can be prevented from traversing the quadrupole rod set Q1. It should be appreciated that this mode of operation is but one possible mode of operation for Q1. By way of example, in some embodiments, the quadrupole rod set Q1 can be configured as an ion trap. In some aspects, the ions can be Mass-Selective-Axially Ejected from the Q1 ion trap in a manner described by Hager in "*A new Linear ion trap mass spectrometer,*" Rapid Commun. Mass Spectra. 2002; 16: 512-526.

Ions passing through the quadrupole rod set Q1 can pass through the stubby ST2 to enter an electron-capture dissociation cell 1304 according to the present teachings. In some embodiments, the dissociation cell 1304 can include a plurality of quadrupole rod sets that are positioned in tandem and to which RF voltages can be applied to confine electrons in the vicinity of the longitudinal axis of the quadrupole rod sets for efficient interaction of the electrons with the precursor ions entering the dissociation module. The capture of one or more electrons by the precursor ions can result in fragmentation of at least a portion of the precursor ions. The fragmented ions can be detected and analyzed by a downstream mass analyzer 1208 in a manner known in the art.

With continued reference to FIG. 2, in this embodiment, a pulsed voltage source 1310 operating under control of a controller 1312 can apply a plurality of voltage pulses to the lens IQ0 to attenuate the brightness of the ion beam for introduction into the downstream quadrupole rod set Q0. For a desired attenuation of the brightness of the ion beam, the controller can determine the requisite pulse width and the duty cycle of the voltage pulses in accordance with the present teachings, e.g., by using the above Equation (3), and can affect the application of such voltage pulses via the pulsed voltage source to the IQ0 lens.

Figure 3:
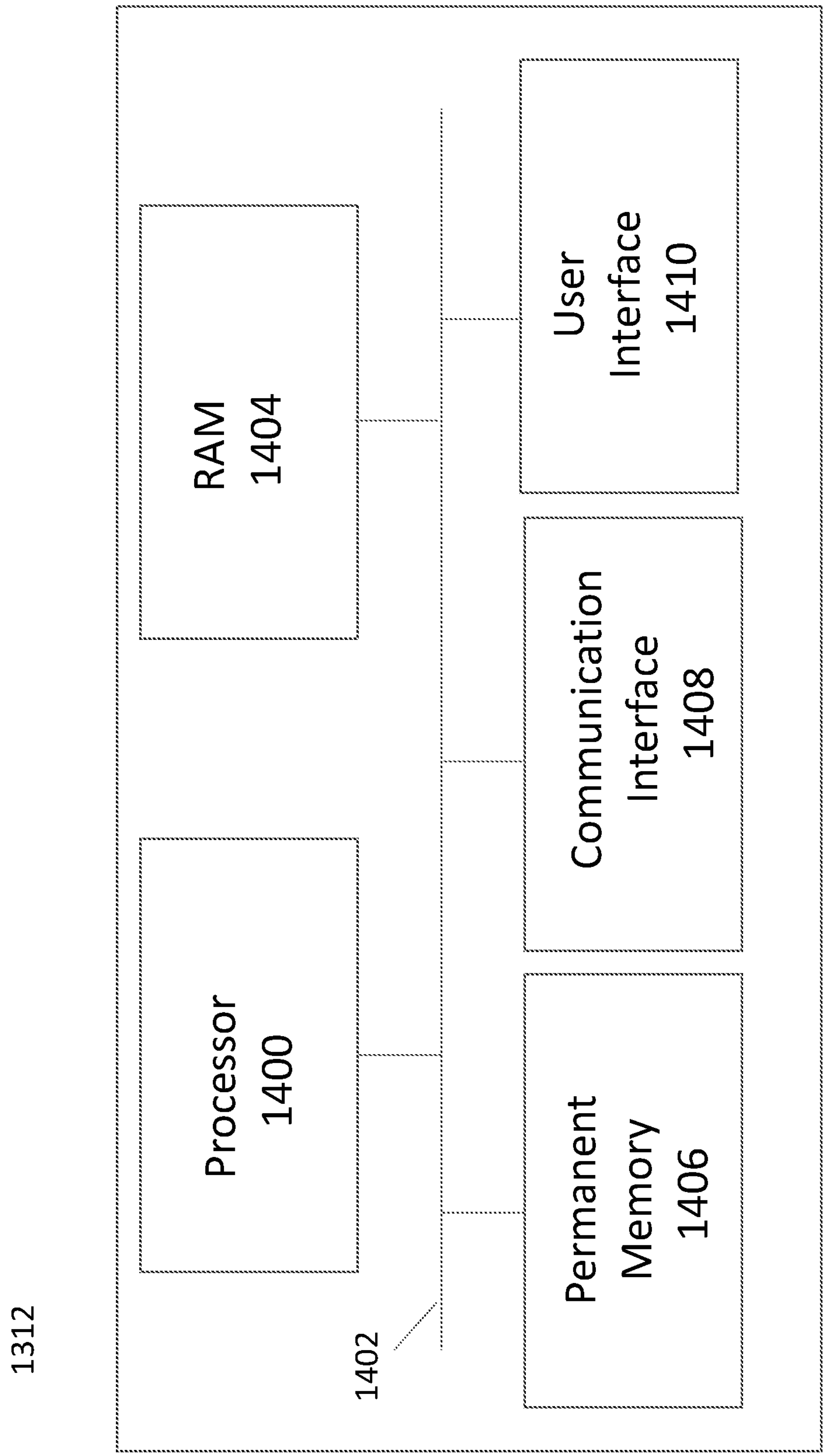
FIG. 3 depicts an example of an implementation of a controller suitable for use in the mass spectrometer of FIG. 2.

By way of example, FIG. 3 schematically depicts an example of an implementation of the controller 1312, in which the controller includes a processor 1400 that is in communication, via a bus 1402, with a random access memory (RAM) module 1404, a permanent memory module 1406, a communication interface 1408 that provides communication between the controller and the pulsed voltage source, and a user interface 1410. In some embodiments, the permanent memory module 1406 can store information regarding the requisite pulse width and duty cycle of voltage pulses that can achieve a desired attenuation of the brightness of the ion beam. The controller can also store information regarding the amplitude, or a range of amplitudes for the voltage pulses. Such information can be calculated based on the above teachings. In particular, as discussed in detail above, a calibration normalized ion intensity versus pulse width relation and an ideal normalized ion intensity versus pulse width relation can be employed to derive the requisite pulse width for the applied voltage pulses at a given duty cycle. As discussed above, in some embodiments, the duty cycle of the voltage pulses can be as low as about 0.1%.

Figure 4:
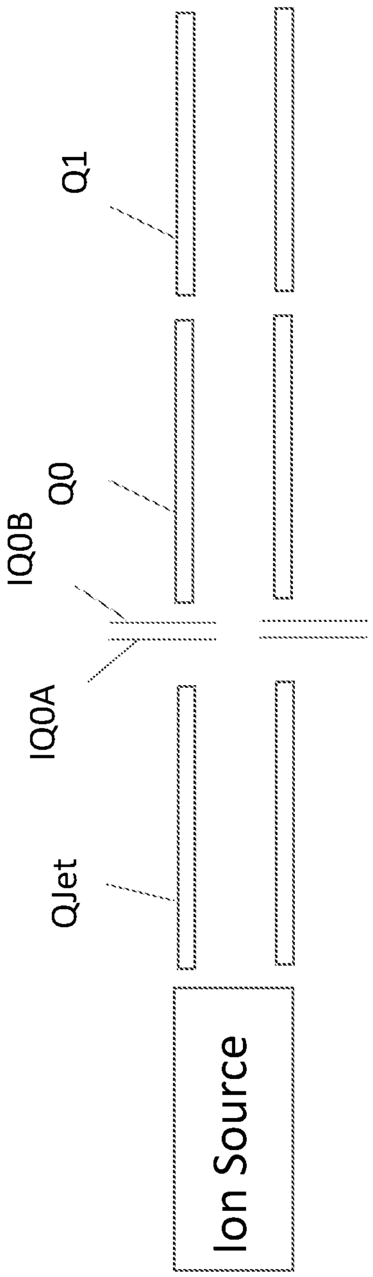
FIG. 4 depicts a partial schematic view of a mass spectrometer according to an embodiment in which a doublet lens is positioned between an upstream ion guide and a downstream mass filter.

As shown schematically in FIG. 4, in some embodiments, a doublet lens comprising a lens IQ0A and another lens IQ0B, which is positioned axially in tandem with IQ0A, can be disposed between the QJet and Q0 quadrupoles. The application of voltage pulses in accordance with the present teachings to the lenses IQ0A and IQ0B can attenuate the brightness of an ion beam passing through these two lenses to reach the downstream quadrupole rod set Q0.

The ions pass through the quadrupole ion guide Q0 to reach the quadrupole mass filter Q1. Though not shown in this figure, one or more ion lenses can be disposed between the Q0 and Q1 quadrupoles. Although in this embodiment the quadrupole rod set Q1 is configured as a mass filter, in other embodiments, it can be configured as a linear ion trap (e.g., a linear ion trap) in a manner known in the art.

The following examples are provided for further elucidation of various aspects of the present teachings. These examples are provided only for illustrative purposes and are not intended to necessarily indicate the optimal ways of practicing the invention and/or optimal results that can be obtained.

EXAMPLES

Figure 5A:
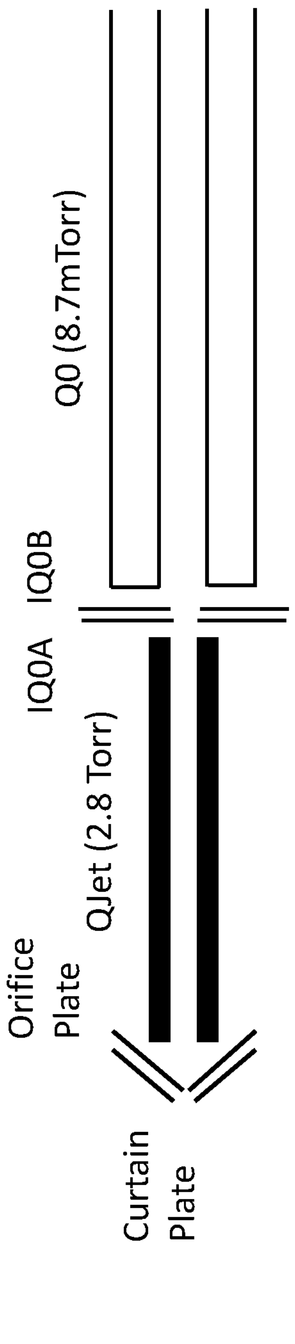
FIG. 5A is a schematic partial view of a mass spectrometer in which a doublet lens comprising two lenses is disposed between an ion guide and a mass filter, where application of voltage pulses in accordance with the present teachings to the lenses provide modulation of the intensity of an ion beam.
Figure 5B:
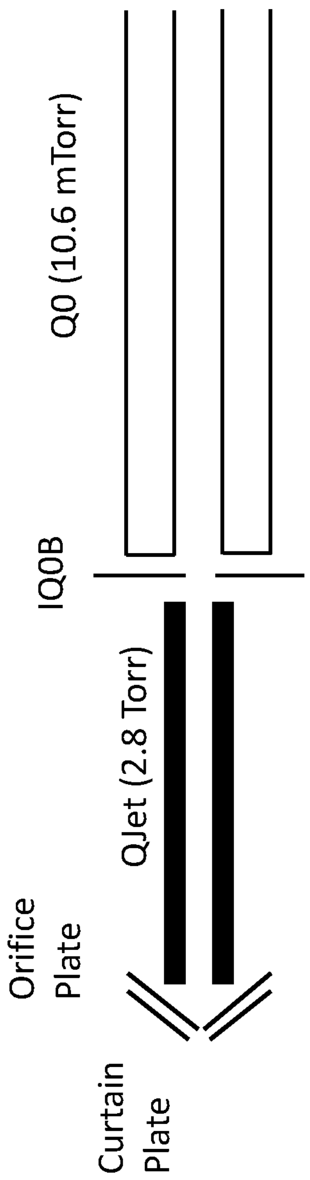
FIG. 5B is a schematic view of modified version of the mass spectrometer depicted in FIG. 5A, where the doublet lens is replaced with a single lens.

The data discussed in the following examples were obtained using a hybrid triple quadrupole linear ion trap mass spectrometer, which was modified in accordance with the present teachings. FIGS. 5A and 5B schematically depict the relevant ion optics. In particular, FIG. 5A shows an RF ion guide, which is herein designated as QJet, operating at a pressure of 2.8 Torr followed by a dual IQ0 lens (IQ0A and IQ0B), and then a Q0 region, which can be configured as an RF only ion guide, operating at 8.7 mTorr. The lenses IQ0A and IQ0B had aperture diameters of 1.4 mm and 1.5 mm, respectively. In both regions, the pressure is primarily due to nitrogen, which enters the mass spectrometer through the aperture in the orifice plate. Specifically, a gas flow of nitrogen was introduced between the orifice and curtain plates such that the total flow was greater than the flow of nitrogen into the vacuum chamber through the orifice plate aperture. The excess nitrogen flowed outwards through the curtain plate aperture.

FIG. 5B shows an arrangement similar to that shown in FIG. 5A with the exception that the IQ0A lens has been removed. The removal of the IQ0A lens resulted in an increase in the pressure of the Q0 region from 8.7 mTorr up to 10.6 mTorr. The increase in the pressure was due to the larger 1.5 mm diameter of the aperture of the IQ0B lens.

Ion Kinetic Energies

Ions that are transported through the high pressure region of the QJet ion optic (See, FIG. 5A) will acquire the velocity of the gas jet, which can lead to ions having a mass dependent axial kinetic energy. At the IQ0B lens, the gas undergoes an expansion into the lower pressure Q0 region (e.g., 8.7 mTorr in the Q0 region versus 2.8 Torr in the QJet region). Using known free jet expansion equations, the maximum axial velocity can be calculated for a fully developed expansion. Such a calculation produces a maximum axial gas velocity of 765 m/s for a pressure of 2.8 Torr in the QJet region and a pressure of 8.7 mTorr in the Q0 region. However, in this region the radial dimensions of the gas expansion are greater than the radial dimensions of the Q0 ion optic leading to a disrupted expansion, which would result in the ions not attaining as a high a velocity compared to an expansion that is fully developed. The axial kinetic energy of the ions is a function of the velocity that they have attained. For a maximum velocity of 765 m/s, a upper limit to the kinetic energy of the ions can be calculated as presented in Table 1 below:

TABLE 1

| Ion kinetic energy (V = 765 m/s) | |
|---|---|
| m/z | Ion Kinetic Energy (eV) |
| 29 | 0.088 |
| 322 | 0.977 |
| 922 | 2.797 |
| 2122 | 6.436 |

Figure 6A:
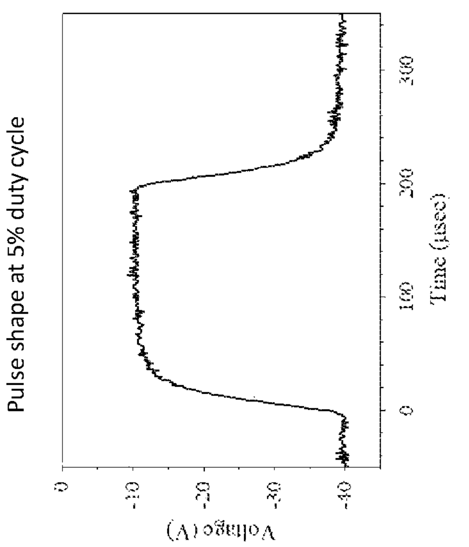
FIG. 6A depicts a voltage pulse for application to the lenses shown in FIG. 5A or FIG. 5B.

As a result of the different kinetic energies of the ions, their response to a voltage applied to a lens (e.g., IQ0A) disposed between the QJet and Q0 regions will be mass dependent. The ions kinetic energies can be modified relative to those listed above due to collisions with the background gas and by the gradient electric field by the pulse applied to the lens, which can cause kinetic energy losses. But in general, more electric potential is required to stop heavier ions. FIG. 6A shows the shape of a voltage pulse applied to the IQ0B lens at a duty cycle of 5%. In the ion transmission mode, the DC potential on IQ0B is held at −10 V, while in the ion non-transmission mode the DC potential is dropped to −40 V. These values are representative of potentials that are typically employed for positive ion mode.

Figure 6B:
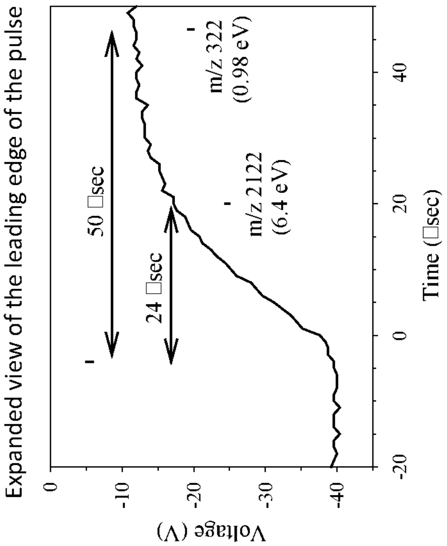
FIG. 6B depicts the leading edge of the voltage pulse shown in FIG. 6A.

FIG. 6B shows the leading edge of the voltage pulse depicted in FIG. 6A. With reference to FIG. 6B, once an ion transmitting voltage pulse is applied to IQ0B lens, it takes about 24 microseconds for the applied DC potential to increase to a level that would allow the transmission of m/z 2122 ions while for m/z 322 ions the required time for transmission is 50 microseconds based upon the ion kinetic energies presented in Table 1 above.

Changing the applied DC potential from an ion transmitting to an ion non-transmitting mode occurs more quickly as the falling edge of the pulse is more steep than the rising edge thereof. In other words, in this example, the ion beam can be turned off more quickly than it can be turned on. It should also be noted that the on-axis potential experienced by the ions will be different than the potential applied to the lens due to the ion optics positioned on either side of the lens and the diameter of the lens aperture. Nonetheless, FIGS. 6A and 6B show that the response of the ions to the potential applied to the lens will be mass dependent when the ions have different kinetic energies.

Figure 7A:
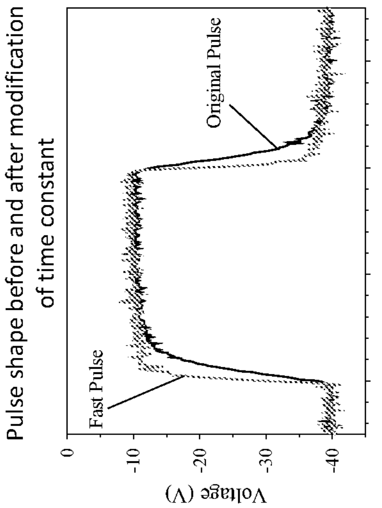
FIG. 7A depicts two voltage pulses, where one of the voltage pulses has a faster rise time.
Figure 7B:
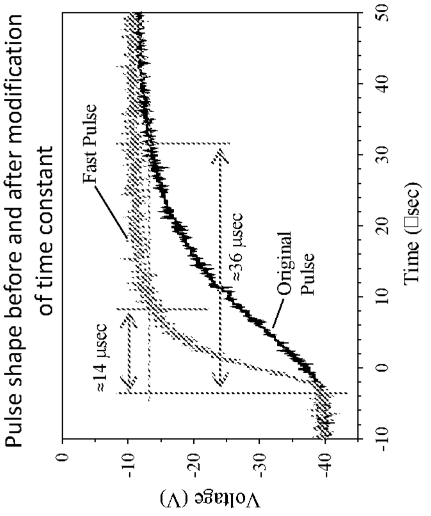
FIG. 7B depicts the leading edges of the voltage pulses depicted in FIG. 7A.

A decrease in the rise time of a voltage pulse applied to the lens will increase the rate of response of the ions to the pulse. The faster the response, the closer will be the transmitting potential time period to the desired transmitting time period. FIGS. 7A and 7B compare the voltage pulse depicted in FIGS. 6A and 6B relative to a voltage pulse having a faster rise and fall time. In particular, the 90% rise time has been decreased from about 36 microseconds to about 14 microseconds. The reduced rise time will result in a faster response of the ions to the pulse.

Transmitting v.s. Non-Transmitting Lens Potentials

Figure 8:
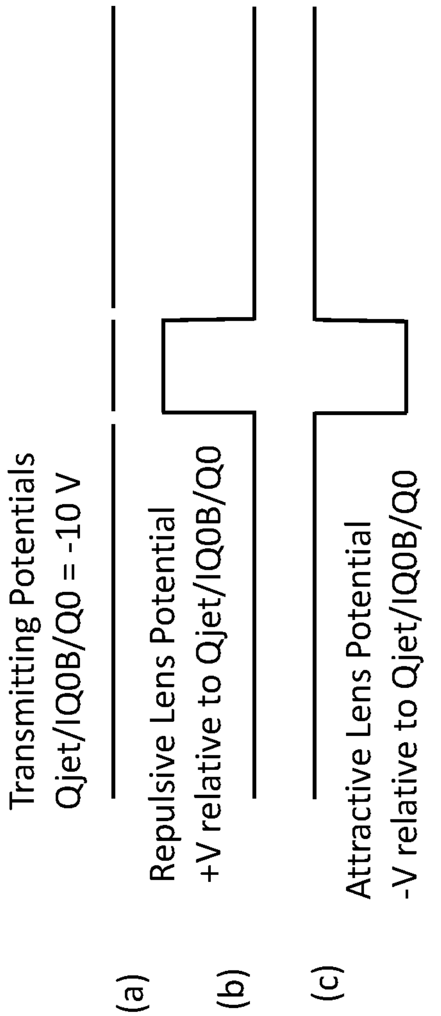
FIG. 8 shows in three panels (i.e., panels (a), (b), and (c)) different patterns of electrical potentials that can be applied to a lens positioned between an ion guide and a downstream component (e.g., a mass filter or an ion trap) of a mass spectrometer, FIG. 9A schematically depicts the trajectory of ions through a lens positioned between an ion guide and downstream component when the voltage pattern shown in panel (a) of FIG. 8 is applied to the lens, FIG. 9B schematically depicts the trajectory of ions through the lens shown in FIG. 9A when the voltage pattern shown in panel (b) of FIG. 8 is applied to the lens, FIG. 9C schematically depicts the trajectory of ions through the lens shown in FIG. 9B when the voltage pattern shown in panel (c) of FIG. 8 is applied to the lens.
Figure 9A:
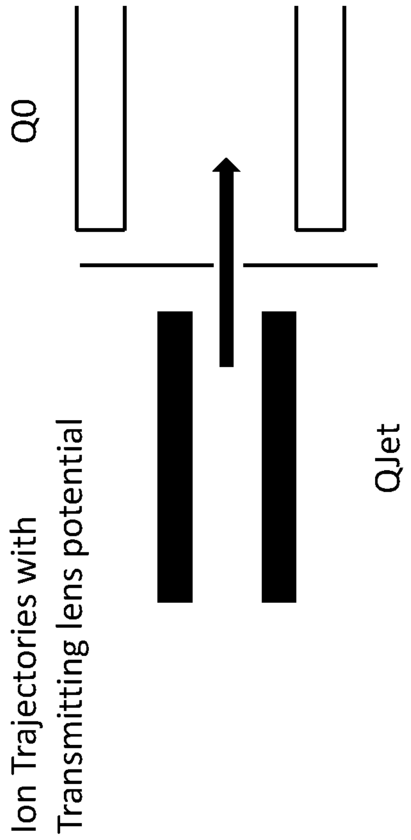

In many embodiments, an ion beam can be turned off by either increasing a DC potential applied to a lens, through which the ions pass, relative to adjacent ion optics or by reducing the DC potential. For example, FIG. 9A schematically depicts a lens IQ0B positioned between an ion guide (QJet) and a quadrupole RF only ion guide Q0. FIG. 8 shows in panels (a), (b) and (c) different patterns of electric potentials that can be applied to these components.

Upon application of equal DC potentials to these components, as shown in panel (a), the ions are expected to be transmitted straight through the lens as shown in FIG. 9A.

Figure 9B:
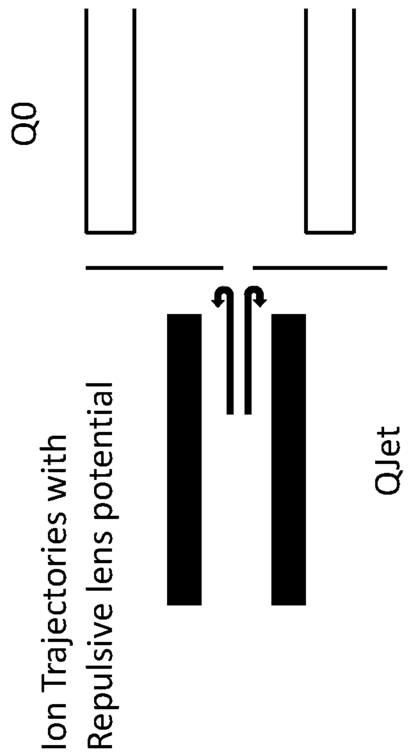

When the DC potential applied to the lens is raised, as shown in panel (b) of FIG. 8, an electrostatic barrier is generated, leading to the repulsion of the ions (in this case positive ions) on the upstream side of the lens as shown in FIG. 9B.

Figure 9C:
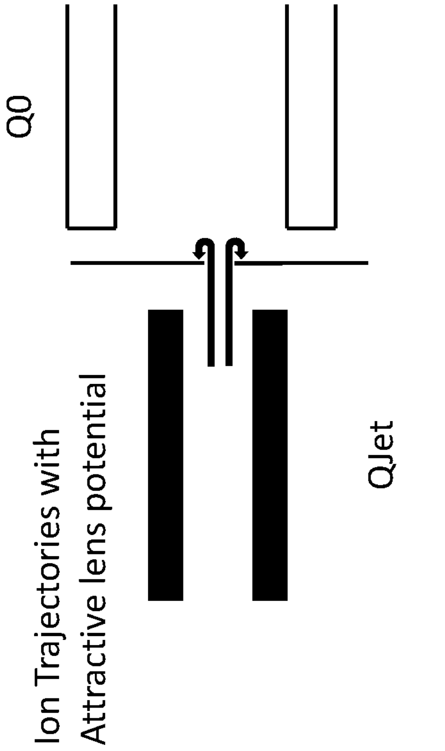

When the DC potential applied to the lens is set to an attractive potential, the ions will be transmitted through the lens and be redirected to the downstream side of the lens where they are neutralized, as shown in FIG. 9C. In this case, the collision of the ions with the background gas is needed to lower the kinetic energy of the ions and allow the ions to be attracted back to the lens after they pass through the lens.

As discussed above, in many embodiments, the amplitude of the DC potential applied to the lens is selected to be sufficiently high so as to inhibit the transmission of 100% of the ions to the downstream components.

Signal as a Function of Lens Duty Cycle

Figure 10:
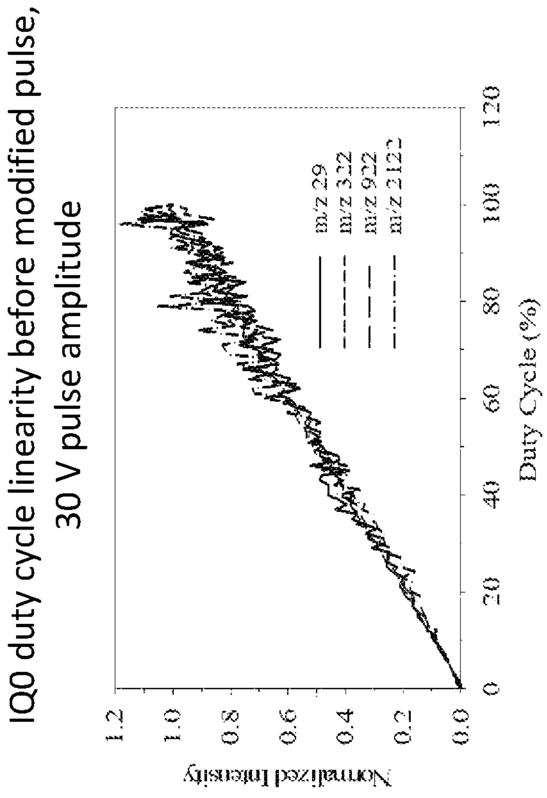
FIG. 10 shows plots of normalized ion intensity versus duty cycle of applied voltage pulses having a rise time of 36 microseconds and an amplitude of 30 V for a plurality of m/z ratios.

FIG. 10 shows normalized ion intensity as a function of duty cycle of voltages applied to the lens IQ0B for ions having m/z ratios of 29, 322, 922 and 2122. The duty cycle was varied from 0 to 100%. The voltage pulses had a rise time of 36 microseconds and 30 V amplitude. The pulses were negative going (See, e.g., FIG. 9C). The normalization of the ion intensity signal for the data shown in FIG. 10 was based on 100% duty cycle.

Figure 11:
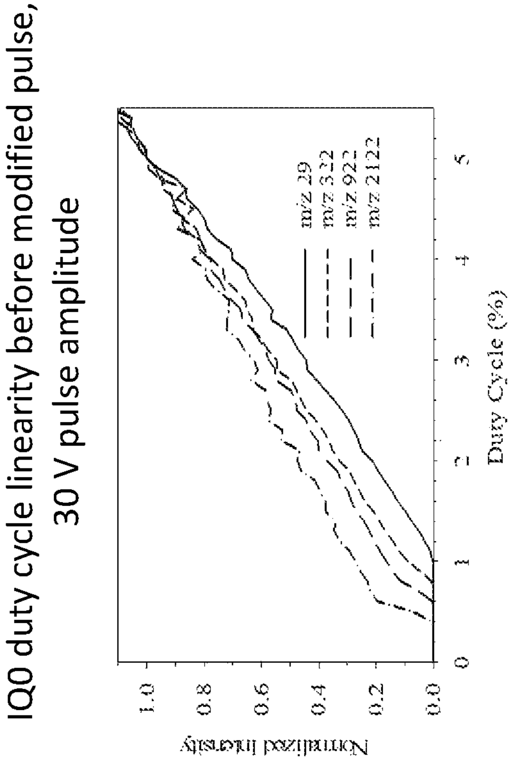
FIG. 11 shows a portion of the plots depicted in FIG. 10 at low duty cycles.
Figure 12:
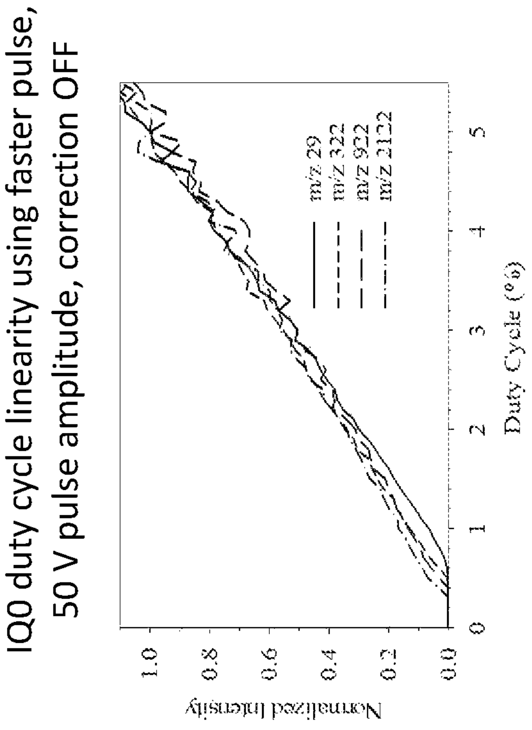
FIG. 12 shows plots of normalized ion intensity versus duty cycle of applied voltage pulses having a rise time of 14 microseconds and an amplitude of 50 V for a plurality of m/z ratios.

The data shown in FIGS. 11 and 12 were normalized at 5% duty cycle. This normalization was selected based on the amount of error in pulse width compared to the overall cycle time. An error of 14 microseconds would cause a voltage pulse having a pulse width of 200 microseconds applied at a duty cycle of 5% to be equivalent to a pulse width of 186 microseconds at a duty cycle of 4.65%. This represents an error of 0.35%. Further, it should be noted that a signal of 1e7 cps at full intensity that undergoes attenuation at a duty cycle of 5% would result in 1e7 cps*200 microseconds=2000 ions. In a pulse counting system, the noise is proportional to the square root of the total number of counts. As such, in this example, the noise would be equal to $(2000)^{1/2}$=45 counts. The relative noise is therefore 4/2000*100%=±2.3%. The noise associated with the pulse width (i.e., 0.35%) is less than the signal noise so it is not expected that normalizing at 5% duty cycle will have a noticeable effect on the signals at lower duty cycle values.

The plots appear fairly linear from 0 to 100% duty cycle. However, a closer look at the region below a duty cycle of 5% shows that the plots are in fact non-linear, as shown in FIG. 11. The intercept of the plots are non-zero and are mass dependent whereas in the ideal case the plots are expected to have the same intercept and slope. Decreasing the rise time of the pulses to 14 microseconds improves the linearity of the normalized ion intensity versus duty cycle, as shown in FIG. 11.

It has been observed that increasing the amplitude of the voltage pulses can improve the linearity of normalized ion intensity versus duty cycle of the applied pulses. FIG. 12 presents normalized ion intensity as a function of the duty cycle of applied pulses for pulses having a rise time of 36 microseconds, but with an increase in the amplitude of the pulses from 30 V to 50 V. Each of the plots shows a projected intercept with the y axis that falls below y=0.

Figure 13:
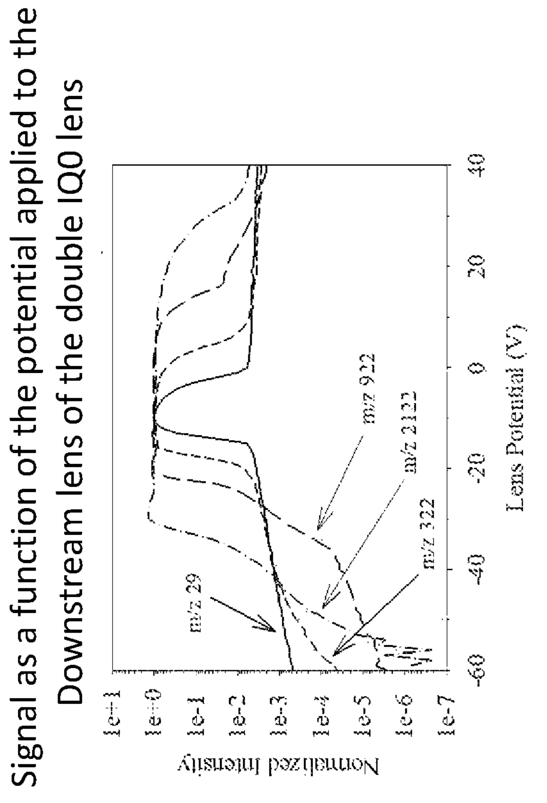
FIG. 13 shows plots of normalized ion intensity versus lens potential for a plurality of m/z ratios.

FIG. 13 shows plots of normalized ion intensity as a function of amplitude of DC potential applied to the IQ0B lens. When the potential is set to −40 V, some ions leak through the lens. At m/z 29 and m/z 322, an ion leakage of about 0.13% is observed while at m/z 922 the ion leakage drops to 0.004% and then rises to 0.23% for m/z 2122. The plots of FIG. 13 indicate that the pulse amplitude should be high in order to reduce the effect of ion leakage. This can also result in improved linearity as shown in FIG. 12.

Lens Potential: Compound Dependency

Figure 14A:
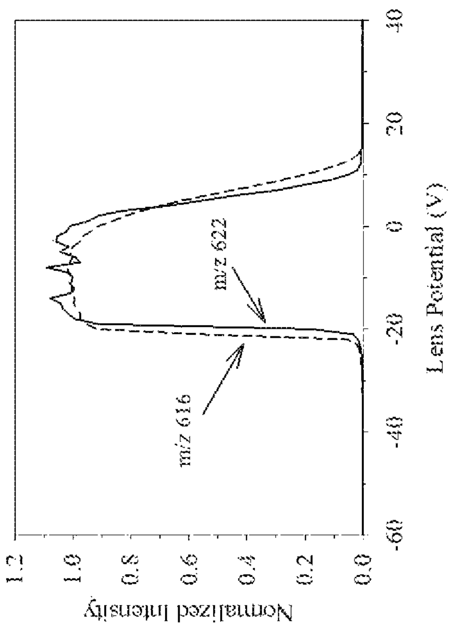
FIGS. 14A-14C show plots of normalized ion intensity versus lens potential for a plurality of different compounds.
Figure 14B:
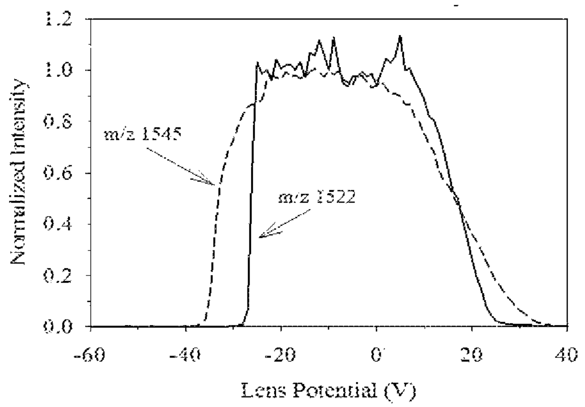
Figure 14C:
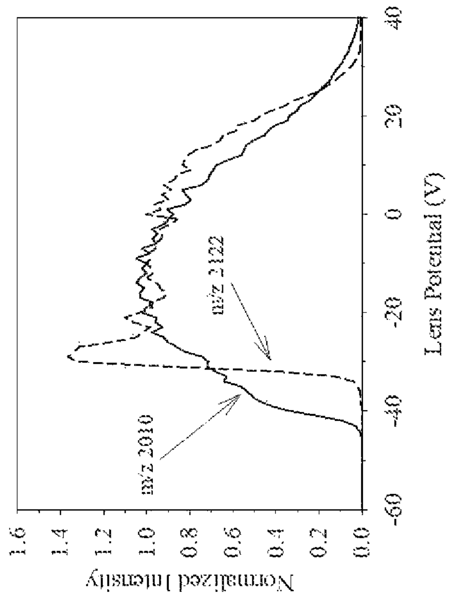

FIGS. 14A-14C show that the ion transmission characteristics depend also on the analyte (compound) under analysis. These plots depict normalized ion intensity versus lens potential for a PPG (poly(propylene) glycol) and an Agilent tuning mixture (a mixture composed of homogeneously substituted triazatriphosphorines, See, U.S. Pat. No. 5,872,3571), which have similar masses. The data presented in FIGS. 14A-14C show that the transmission characteristics of the compounds through the lens differ. To ameliorate this difference, the amplitude of the voltage pulses applied to the lens was set to 50 V (from −10 V to −60 V absolute potentials applied to the lens), which was the maximum potential provided by the available power supply.

Lens Potential: Pressure Dependency

Figure 15A:
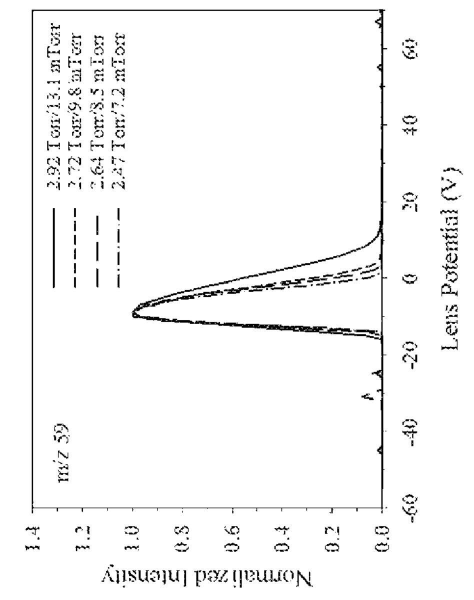
FIGS. 15A-15C show plots of normalized ion intensity as a function of DC potential applied to a lens positioned between an ion guide and a downstream component for different pressures of the ion guide and the downstream component and for a plurality of different m/z ratios.
Figure 15B:
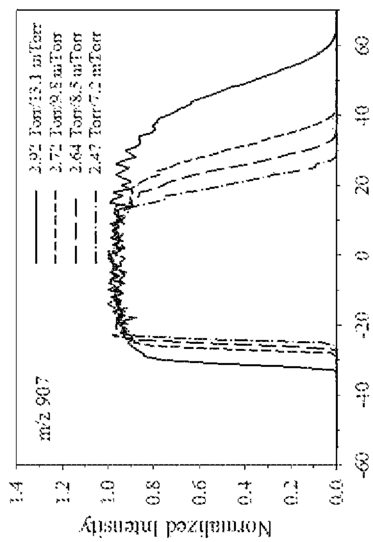
Figure 15C:
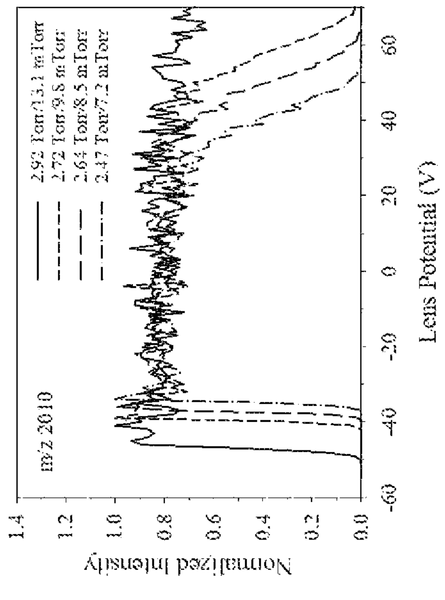
Figure 16A:
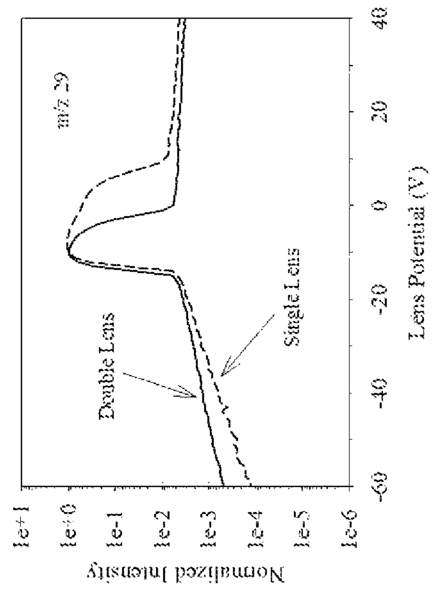
FIGS. 16A-16D show plots of normalized ion intensity as a function of DC potentials applied to a single lens and double lens positioned between an ion guide and downstream components for a plurality of different m/z ratios.
Figure 16B:
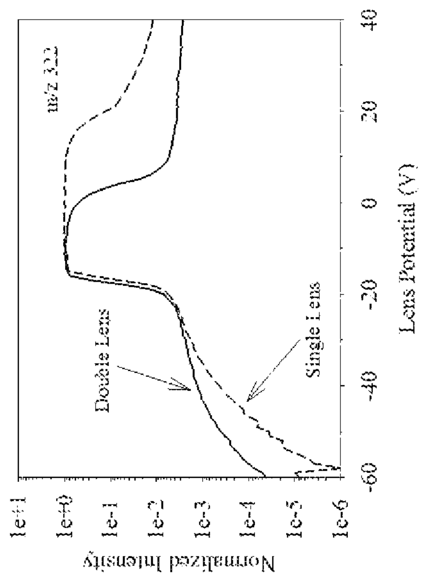
Figure 16C:
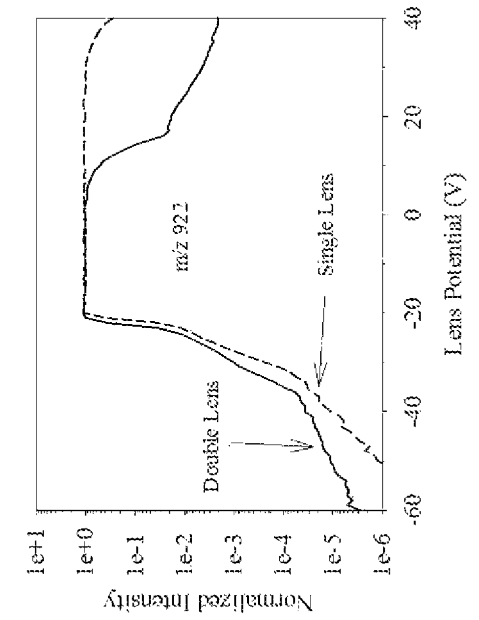
Figure 16D:
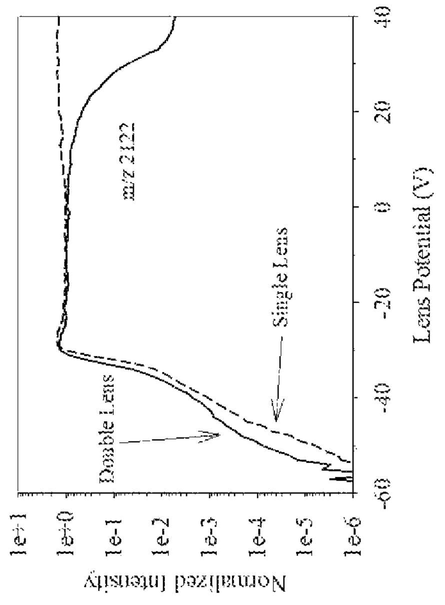

FIGS. 15A-15C show the effects of changing the pressure in the QJet and Q0 ion optics on the shape of the lens potential curves. In these examples, the PPG ions were used for collecting the data. The pressures displayed in each figure represent the pressure in the QJet region followed by the pressure in the Q0 ion optic region. The presented data shows that in each case, the lens potential profile becomes broader as the pressure increases. The variation for the positive lens potential is more pronounced relative to that for the negative lens potential. Further, the increase in the widths of the profiles becomes larger as the ion mass increases.

Lens Potential: Single vs Double Lens

FIG. 16A-16D show plots providing a comparison of normalized ion intensity versus lens potential for a number of ions with different m/z ratios using a single lens versus a double lens between the QJet and Q0 regions (See, FIGS. 5A and 5B). In all cases, the single lens potential shows a more rapid decline in transmission when the lens potential is set to a negative value. However, when the lens potential is set to a positive value, the transmission window increases to higher positive lens potentials and in some cases, the non-transmitting or blocking potential lies beyond a range provided by the available power supply. The shapes of the curves indicate that it would be better to apply a negative lens potential than a positive lens potential with the single lens turning off the ion beam more completely than the double lens.

Lens Potential: Fragment Ions Versus Non-Fragment Ions

Figure 17:
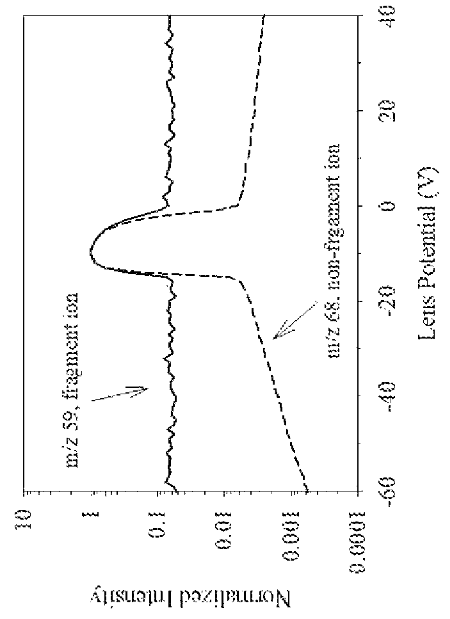
FIG. 17 shows plots of normalized ion intensity as a function of DC potential for a non-fragmented ion at m/z 68 and an ion fragment at m/z 59.

The data presented in FIG. 17 shows that when ions are formed during transit along the ion guides, transmission through the lens can occur over a wide range of potentials applied to the IQ0B lens. M/z 59 is known to be a fragment ion that can be formed within the interface region of the mass spectrometer and along the ion guides. FIG. 17 depicts the normalized ion intensity as a function of lens potential for m/z 59 fragment ion and the stable ion at m/z 68. Large ions may be able to transmit through the IQ0B lens if the potentials are not sufficient to prevent their transmission. If a large ion passes through the lens and fragments on the downstream side of the lens in the Q0 ion optic producing m/z 59 ion fragment, then it appears that m/z 59 was transmitted. In this example, m/z 59 was not transmitted but rather it was created on the downstream side of the lens. The intensity of the ion fragment is expected to be highly dependent upon the ion source and the interface conditions.

Extension of Duty Cycle Linearity

FIGS. 18A-18D show plots of normalized intensity of ions passing through the IQ0B lens as a function of pulse width of the applied voltage pulses for ions having different m/z ratios. Each plot shows an ideal normalized ion intensity versus pulse width as well as a calibration normalized ion intensity versus pulse width fitted to a linear relationship. An ion intensity obtained via application of 200 microsecond voltage pulses at a 250 Hz pulse rate corresponding to a duty cycle of 5% to the lens was employed as a reference intensity to obtain normalized intensities. That is, the measured or expected ion intensities were divided by the reference intensity to obtain normalized intensities.

Each graph depicts a plot representing normalized measured ion intensity as a function of pulse width for voltage pulses having a rise time of about 14 microseconds (herein referred to as calibration normalized ion intensity versus pulse width), a linear fit to the measured normalized intensity data as a function of pulse width, and a plot representing an ideal normalized intensity as a function of pulse width. The ideal normalized ion intensity is an intensity that is expected if the voltage pulses applied to the lens had a vanishing rise time and the non-transmitting potentials applied to the lens would completely inhibit the transmission of ions through the lens.

The linear fits of the calibration ion intensity versus pulse width show slopes and intercepts that vary as a function of m/z ratios.

Figure 19:
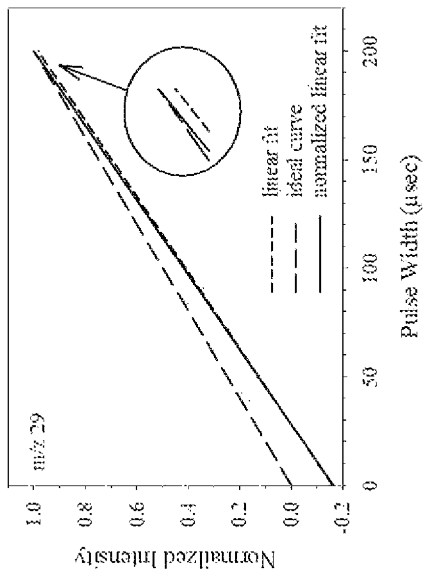
FIG. 19 shows plots obtained by fitting the data presented in FIG. 18A to linear relations.

FIG. 19 shows the fits to ideal and calibration normalized ion intensity versus pulse width for m/z 29. In this example, the linear fit to the data was normalized to the ideal fit at the 200 microsecond pulse width point. In other words, the above Equation (2) was renormalized a second time. FIG. 20 shows that for m/z 29, in order to obtain a normalized ion intensity of 0.4 the pulse width of the applied voltage pulses should be about 96.7 microseconds (point B) while an a pulse width of 80 microsecond would be needed to obtain a normalized ion intensity of 0.4 if the pulses were ideal (i.e., if the pulses had a vanishing rise time and would completely inhibit the transmission of ions through the lens).

A linear fit to an ideal normalized ion intensity versus pulse width plot can be represented by the above Equation (1), which is reproduced below:

$$y = m_1 x_1,$$

and a linear fit to a calibration normalized ion intensity versus pulse width plot can be represented by the above Equation (2), which is also reproduced below:

$$y = m_2 x_2 + b,$$

As discussed in detail above, these two equations can be employed to obtain the above Equation (3) for the pulse width of an applied pulse that would result in a normalized ion intensity y, which is reproduced below:

$$x_2 = \frac{m_1 x_1 - b}{m_2}.$$

The mass dependent coefficients $m_2$ (slope) and b (intercept) for the above calibration data are plotted in FIGS. 21A and 21B, respectively. In this example, the slope and the intercept can be represented by a fit to the following third order polynomials:

$$m_2 = -1.5678\times10^{-13}x^3 + 7.9705\times10^{-13}x^2 - 1.2565\times10^{-6}x + 5.8566\times10^{-3},$$

$$b = 3.136\times10^{-11}x^3 - 1.594\times10^{-7}x^2 + 2.513\times10^{-4}x - 1.713\times10^{-1}$$

If an ideal pulse width defined by $x_1$ is desired then this value can be inserted into the above Equation (3) to obtain a value for $x_2$ representing the pulse width of the voltage pulses to be applied to the lens.

Figure 22:
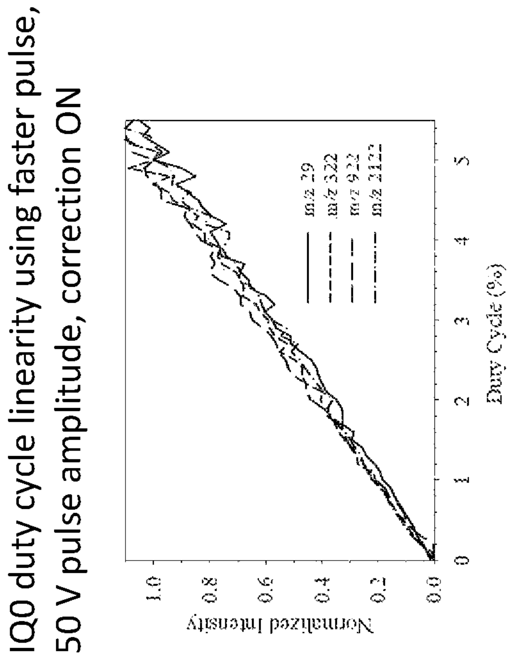
FIG. 22 shows plots of normalized ion intensity as a function of duty cycle of applied voltage pulses for a positive ion mode.
Figure 23:
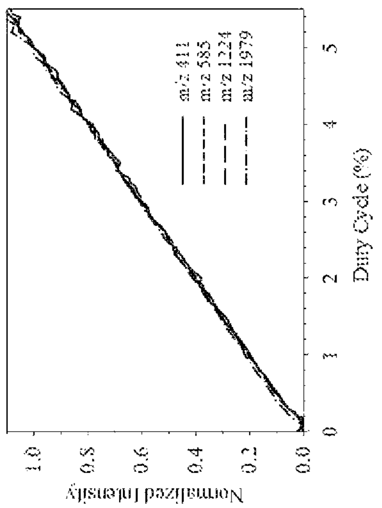
FIG. 23 shows plots of normalized ion intensity as a function of duty cycle of applied voltage pulses for a negative ion mode.
Figure 24:
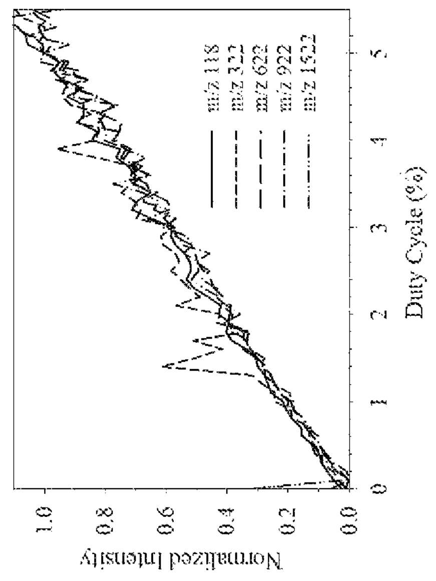
FIG. 24 shows plots of normalized ion intensity as a function of duty cycle of applied voltage pulses for a positive enhanced product ion (EPI) mode.

FIGS. 22-24 show plots of normalized ion intensity passing through the above lens IQ0B as a function of duty cycle for positive ion mode, negative ion mode and positive enhanced product ion (EPI) mode of operation, respectively. The duty cycle was 5%, which corresponds to a pulse width of 200 microseconds. The pulse amplitude was set to the maximum pulse amplitude that could be delivered by the power supply (i.e., 50 V). In the EPI experiment in which a linear ion trap was used, the trap was filled for about 4 ms for each data point, which allowed matching the fill time to the 250 Hz pulse rate.

Figure 25:
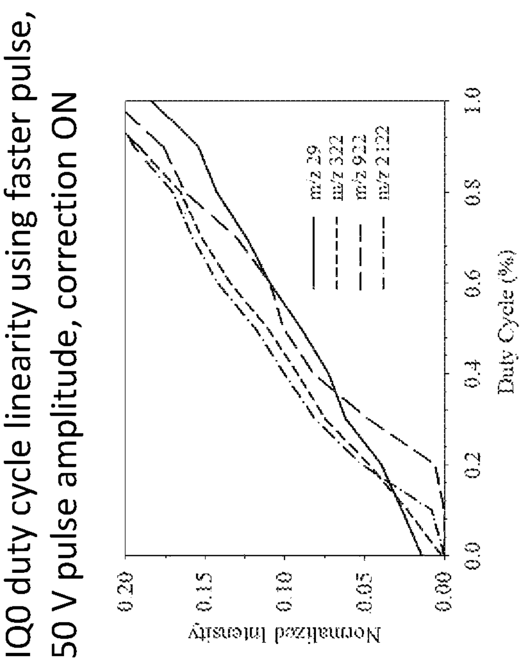
FIG. 25 shows an expanded view of the plots presented in FIG. 24.

FIG. 25 shows an expanded view of FIG. 22, illustrating the region from 0 to 1% duty cycle. It can be seen that for higher masses, there is a region of reduced intensity below about 0.3% duty cycle. Without being limited to any particular theory, this reduced intensity can be due to trapping of ions in a region between IQ0B lens and the Q0 ion optic as a result of short transmitting pulses.

Figure 26A:
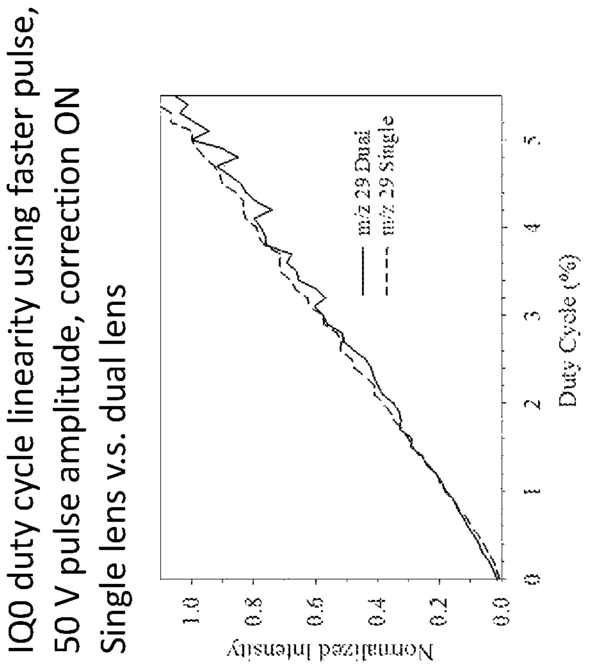
FIG. 26A shows plots of normalized ion intensity as a function of duty cycle for m/z 29 for application of voltage pulses to a single lens and a doublet lens.
Figure 26B:
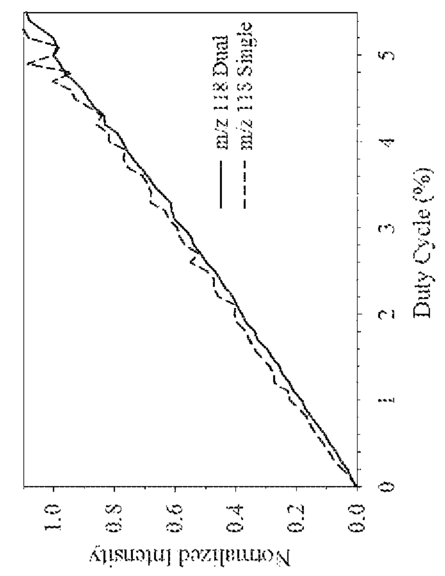
FIG. 26B shows plots of normalized ion intensity as a function of duty cycle for m/z 118 for application of voltage pulses to a single lens and a doublet lens.
Figure 26C:
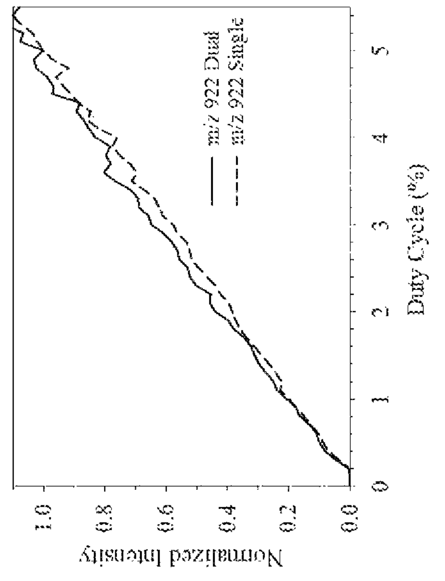
FIG. 26C shows plots of normalized ion intensity as a function of duty cycle for m/z 922 for application of voltage pulses to a single lens and a doublet lens.
Figure 26D:
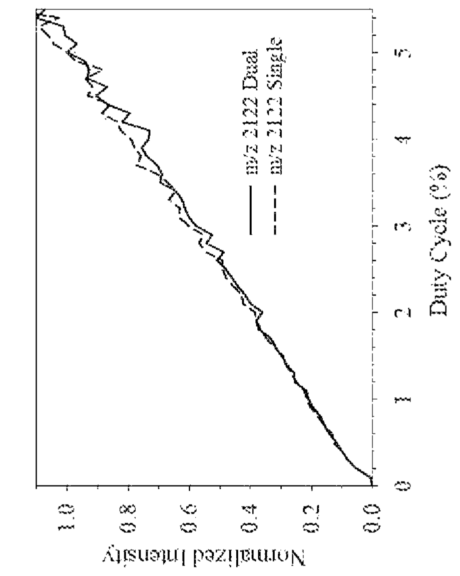
FIG. 26D shows plots of normalized ion intensity as a function of duty cycle for m/z 2122 for application of voltage pulses to a single lens and a doublet lens.

FIGS. 26A-26 D present plots of normalized ion intensity as a function of duty cycle for a plurality of m/z ratios and for two cases: (1) when a single IQ0B lens is positioned in proximity of the inlet port of Q0 quadrupole, and (2) when a doublet lens IQ0A and IQ0B is positioned in proximity of the inlet port of Q0 quadrupole. In all cases, the amplitude of the voltage pulse was selected to be 50 V (i.e., the maximum amplitude provided by the power supply). This data shows that the linearity of attenuation of the ion beam is maintained with both single lens and the doublet lens, thus indicating the present teachings provide a robust method and system for attenuating the brightness of an ion beam in a mass spectrometer.

Figure 27:
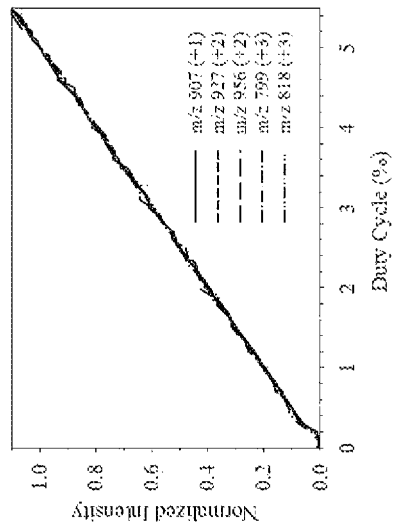
FIG. 27 shows normalized ion intensity as a function of duty cycle for a plurality of m/z ratios in accordance with an embodiment of the present teachings, illustrating that duty cycle linearity is maintained not only for singly-charged but also for multiply-charged ions.

FIG. 27 shows that the duty cycle linearity is maintained for multiply charged ions as well. In this example, ions with charge states +1, +2, and +3 all display the same linearity. The primary difference between multiply charged ions and singly charged ions is the pulse amplitude will be proportional to the charge state of the ion. Therefore, ions with a +3 charge state will experience a pulse of 150 V amplitude while singly charged ions only experience a pulse with a 50 V amplitude.

What is claimed is:

1. A method of modulating transmission of ions in a mass spectrometer, comprising:
- generating an ion beam comprising a plurality of ions,
- directing the ion beam to an ion optic positioned in the path of the ion beam, wherein the ion optic includes at least one opening through which the ions can pass,
- applying one or more voltage pulses at a selected duty cycle to said ion optic so as to obtain a desired attenuation of brightness of the ion beam passing through the ion optic,
- wherein a pulse width of said voltage pulses at said selected duty cycle is determined by identifying a pulse width on a calibration normalized ion intensity versus pulse width relation for said ions that corresponds to said desired attenuation on an ideal normalized ion intensity versus pulse width relation for said ions.

2. The method of claim 1, wherein said calibration normalized ion intensity versus pulse width relation is obtained via a linear fit to data corresponding to normalized intensity of said ions transmitted through said ion optic as a function of pulse widths of a plurality of voltages applied to said ion optic at said selected duty cycle.

3. The method of claim 2, wherein said ideal normalized ion intensity versus pulse width relation is defined by the following linear relation:

$$y = m_1 x_1,$$

wherein y represents normalized ion intensity, $x_1$ represents ideal pulse width, and $m_1$ represents a slope of the linear relation.

4. The method of claim 3, wherein said calibration normalized ion intensity versus pulse width relation is defined by the following linear relation:

$$y = m_2 x_2 + b,$$

wherein y represents normalized ion intensity, $x_2$ represents pulse width of the voltage pulses applied to said ion optic, $m_2$ represents slope of the linear relation, and b represents intercept of the linear relation.

5. The method of claim 4, wherein said pulse width $x_2$ is determined according to the following relation:

$$x_2 = \frac{(m_1 x_1 - b)}{m_2}.$$

6. The method of claim 5, further comprising renormalizing the relation in claim 5 at 5% duty cycle point.

7. The method of claim 1, wherein said calibration normalized ion intensity for a voltage pulse width associated with a plurality of voltage pulses applied to said ion optic at said duty cycle is obtained as a ratio of measured intensity of ions passing through said ion optic at that voltage pulse width relative to measured intensity of ions passing through said ion optic at a calibration voltage pulse width associated with a plurality of calibration voltage pulses applied to said ion optic at said duty cycle.

8. The method of claim 7, wherein said calibration voltage pulse width is in a range of about 4 microseconds to about 200 microseconds.

9. The method of claim 1, wherein said ions comprise a plurality of different m/z ratios.

10. The method of claim 9, wherein said ideal relation and said calibration relation are determined for at least one of said m/z ratios.

11. The method of claim 10, wherein said ideal relation and said calibration relation determined for said at least one of said m/z ratios is employed to determine said pulse width of the voltage pulses.

12. The method of claim 9, further comprising generating an ideal normalized ion intensity versus pulse width relation and a calibration normalized ion intensity versus pulse width relation for ions having each of said m/z ratios.

13. The method of claim 12, further comprising selecting the ideal relation and the calibration relation for ions having one of said m/z ratios to determine a pulse width of the voltage pulses for application to said ion optic as said ions having said different m/z ratios pass through said ion optic.

14. The method of claim 1, wherein a rise time of said voltage pulses is less than about 20 microseconds.

15. The method of claim 1, wherein said voltage pulses have an amplitude selected to inhibit transmission of ions through said ion optic during an inhibitory phase of said voltage pulses.

16. The method of claim 1, wherein said selected duty cycle is less than about 5%, or less than about 4%, or less than about 3%, or less than about 2%, or less than about 1%, and optionally in a range of about 0.1% to about 1%.

17. The method of claim 1, wherein said voltage pulses have a pulse width less than about 200 microseconds, and optionally in a range of about 4 microseconds to about 200 microseconds.

18. The method of claim 1, further comprising positioning any of an RF only ion guide downstream of said ion optic such that said ion optic is disposed in proximity of an inlet of said RF only ion guide.

19. A method of modulating transmission of ions in a mass spectrometer, comprising:

generating an ion beam comprising a plurality of ions, directing the ion beam to an ion optic positioned in the path of the ion beam, wherein the ion optic includes at least one opening through which the ions can pass, applying one or more voltage pulses to said ion optic at a selected duty cycle so as to modulate passage of the ions through the ion optic, wherein a pulse width of said voltage pulses is determined by calculating an adjustment to a pulse width of an ideal pulse that would result in a desired normalized intensity for ions passing through said ion optic.

20. The method of claim 19, wherein said step of calculating an adjustment comprises utilizing an ideal normalized ion intensity versus pulse width relation and a calibration normalized ion intensity versus pulse width relation for said ions.

21. The method of claim 20, further comprising renormalizing said adjustment at 5% duty cycle point.

22. A mass spectrometer, comprising:

an ion source for generating an ion beam comprising a plurality of ions, an ion optic positioned in a path of said ion beam, said ion optic comprising at least one opening through which ions can pass, a voltage source configured for applying one or more voltage pulses to said ion optic at a selected duty cycle so as to obtain a desired attenuation of brightness of the ion beam, wherein said voltage pulses have a pulse width corresponding to a pulse width on a calibration normalized ion intensity versus pulse width relation for said ions that corresponds to said desired attenuation on an ideal normalized ion intensity versus pulse width relation for said ions.

* * * * *